United States Patent [19]

Baril

[11] Patent Number: 4,674,474
[45] Date of Patent: Jun. 23, 1987

[54] STONE CUTTING WIRE SAW

[75] Inventor: Gerard J. Baril, Uxbridge, Mass.

[73] Assignee: Engelhard Corporation, Menlo Park, N.J.

[21] Appl. No.: 866,035

[22] Filed: Aug. 6, 1986

[51] Int. Cl.⁴ ............................................. B28D 1/06
[52] U.S. Cl. ........................................ 125/21; 125/18
[58] Field of Search .............................. 125/12, 18, 21

[56] References Cited

U.S. PATENT DOCUMENTS 2,679,839 1/1954 Metzger ................................. 125/21
2,773,495 12/1956 Lefevre ................................. 125/21

FOREIGN PATENT DOCUMENTS 2545347 4/1977 Fed. Rep. of Germany ........ 125/21
718311 10/1966 Italy ...................................... 125/21
4618553 10/1967 Japan ..................................... 125/21
1070012 1/1984 U.S.S.R. ............................... 125/21

Primary Examiner—Harold D. Whitehead

[57] ABSTRACT

A wire saw for cutting of stone is disclosed. Abrasive cutter elements are borne on slidable rotatable carriers encompassing a single filament metallic wire. The longitudinal motion of the slidable carrier elements is limited by helical spring restraining elements which are joined to the wire by a non-embrittling process leaving the rear end of the helical spring restraining element fixed to the wire but letting the front portion compress along the axis of the wire thereby absorbing shock imparted to the abrasive cutter elements upon impact with the stone.

16 Claims, 14 Drawing Figures

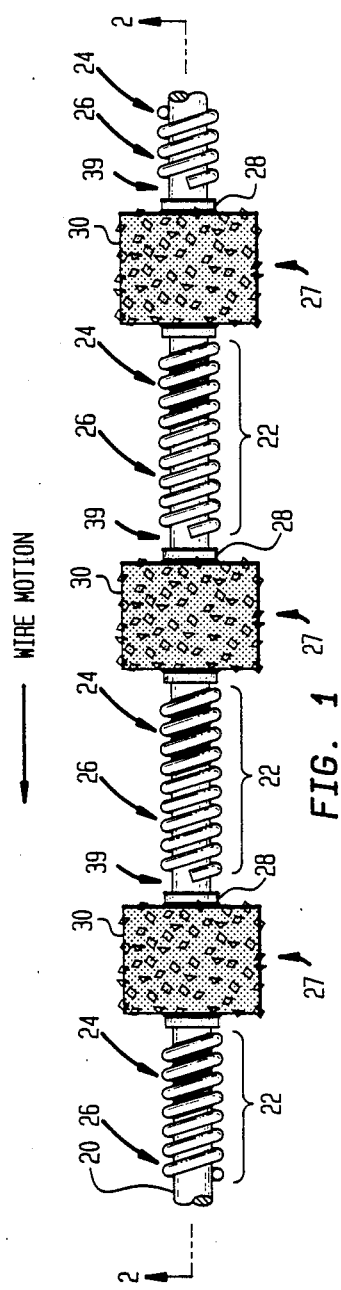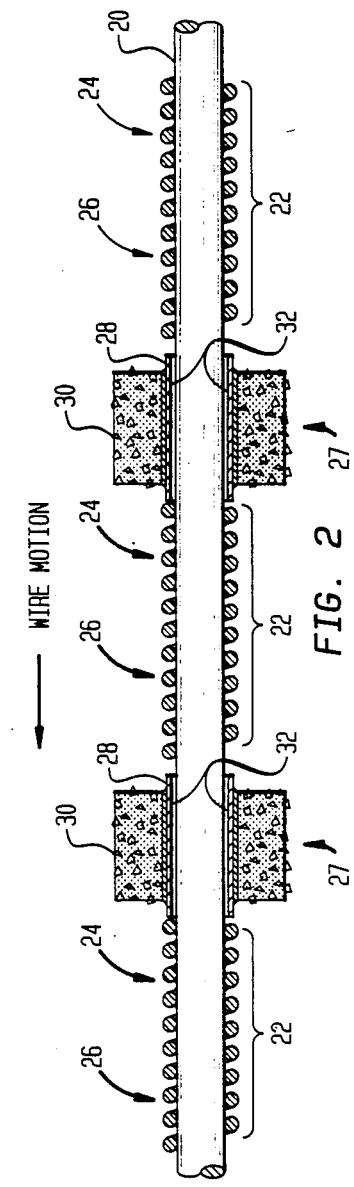

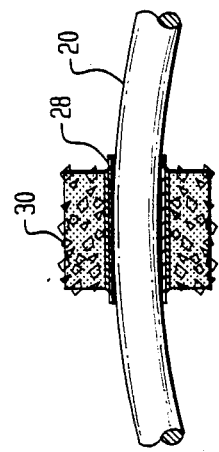
FIG. 6
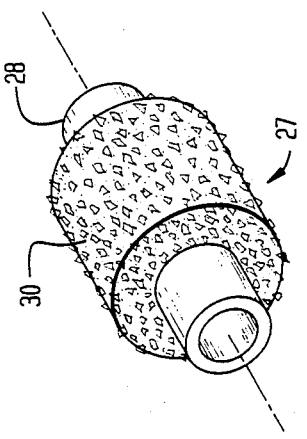
FIG. 5
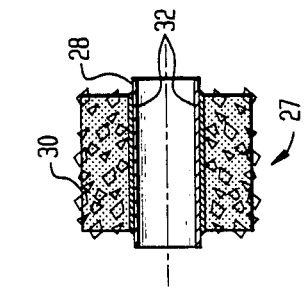
FIG. 4
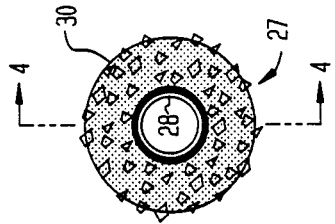
FIG. 3
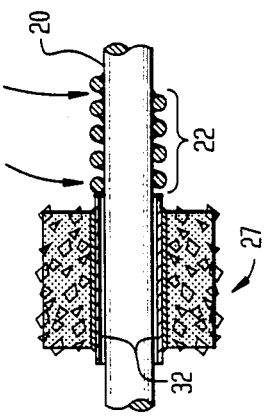
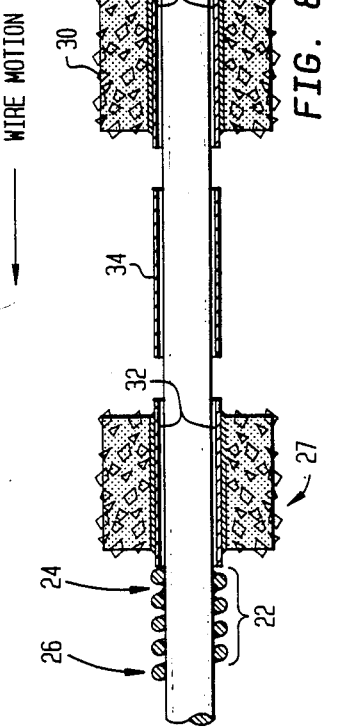
FIG. 8

STONE CUTTING WIRE SAW

Stone has been cut using abrasive elements borne by a flexible carrier since before history. From the first, stone cutters have been cursed by breaks in the flexible carriers and have desired technology for speeding up the cutting process as well as rapidly repairing the all too frequent breaks. The saw of the present invention provides a practical wire saw for cutting of marble and granite at commercially attractive speeds having improved fatigue characteristics, extremely high break off strength of its cutting elements, and a narrow width of cut combined with continuously distributed long life cutting segments using elastically restrained cutter elements borne on an endless single filament metallic wire which in the case of breaks may be easily and quickly repaired in the field by a simple butt-welding.

Heretofore most stone cutting wires have used flexible wire rope or cable. Brazing or welding cable ends together gave rise to wire failure. Intertwining or interlacing strands to make continuous cable, though effective, is time consuming and not readily accomplished in the field. Other cutting wires with solid metallic bodies can be successfully joined by welding, but because the cutting elements were bonded by heat sensitive adhesives, the joining and repairing process is very time consuming, especially in the field. It is an object of the present invention to provide a continuous, weldable wire that has good fatigue characteristics and also is readily joined and repaired in the field.

One type of prior art stone cutting wires with solid metallic bodies bonded the cutting elements directly to the body with adhesives, thereby subjecting the adhesive bond to bending loads. To avoid fatiguing the body, these adhesive bonds are necessarily resilient and are therefore effectively of low strength when compared to stiff silver braze bonds. It is an object of the present invention to provide a wire saw carrying cutting elements joined to rotatable slidable carriers by a braze joint of extremely high bond strength which is not subjected to repeated bending loads, wherein the wire is permitted to bend unrestricted within the clearance in the slidable rotatable carrier preventing fatigue of the wire in the carrier.

Other prior stone cutting wires have used pressure molded resilient material bonded to the cable body, or compressive springs bearing against a soft metallic band swaged to the cable body, or resilient adhesive bonded to the solid body, to transfer the cutting loads to the body of the cutting wire. It is a further object of the present invention to provide a flexible means which does not embrittle the wire for longitudinally yieldably restraining the cutter elements on the wire while absorbing shock and impact of cutting, allowing the cutters to rotate and allowing the wire to pass easily over the drive sheaves.

U.S. Pat. No. 3,661,137 (Prowse, et al) discloses a cable or wire saw bearing slidable convex abrasive elements rigidly restrained longitudinally by gripper elements.

U.S. Pat. No. 2,773,495 (Lefevre) discloses a nylon or plastic cored cable saw bearing compression springs and slidable cutter elements thereupon.

U.S. Pat. No. 4,015,931 (Thakur) discloses a cable saw having bonded abrasive composites secured directly thereto by adhesives or brazing.

U.S. Pat. Nos. 4,031,878 and 4,016,857 (Hall) disclose wire saws having composite, comminuted abrasive in a metal matrix resiliently mounted to the wire by an elastically pliant epoxy based adhesive.

SUMMARY OF THE INVENTION

Previous workers have erred either in choice of flexible carrier or in the means for securing the cutter elements to the carrier. The saw of the present invention uses a single filament metallic wire as a carrier so that the cutter elements may slide freely upon it and breaks in the carrier can be rapidly and conveniently fixed even in the field by a simple butt-welding procedure. The cutters are rotatably and slidably carried on the wire but are elastically and yieldably restrained by helical spring restraining elements which are fixed to the wire by a procedure such as low temperature soldering which does not embrittle the wire or by virtue of the friction between the wire and spring. This avoids difficulties in previous work wherein cables which are not easily repairable are used or in which the cutter elements are fixed too rigidly or too fragilely to the wire leading to excessive breakage.

In a preferred embodiment, the cutting wire comprises a single filament flexible metallic wire, having a substantially circular cross section, and a plurality of rotatable, slidable cutting elements carried on the wire, the cutting elements being held in spaced apart relation by a plurality of torsional metallic springs fixed onto the wire. An endless cutting wire can be formed, by welding the ends of said body together, and thus the wire can operate on the usual spaced apart sheaves of a wire saw.

BRIEF DESCRIPTION OF THE DRAWINGS

FIG. 1 is a side view of one embodiment of the present invention.

FIG. 2 in a sectional view along line 2—2 demonstrating the mounting of the abrasive carriers upon the wire.

FIG. 3 is an end view of a cutter element having abrasive mounted thereon.

FIG. 4 is a sectional view along line 4—4 of the cutter element of FIG. 3.

FIG. 5 is an isometric view of the cutter element of FIGS. 3 and 4.

FIG. 6 is a sectional view illustrating the internal clearance which allows cutter elements to pass over the large cylindrical drums or drive sheaves (not shown) use to drive the wire.

FIG. 8 is a sectional view corresponding in FIG. 2 but illustrating an alternative embodiment in which more than one cutter is used for each helical spring restraining element and adjacent cutters are separated by collars.

DETAILED DESCRIPTION OF THE PREFERRED EMBODIMENTS

Figure 7:
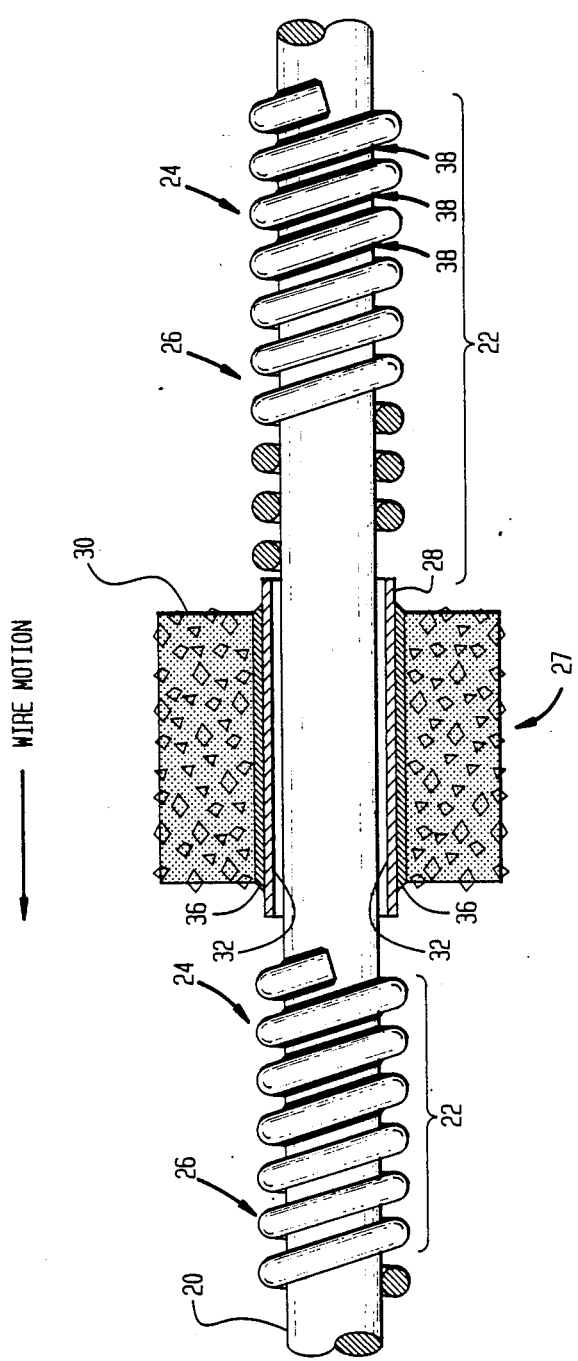
FIG. 7 is a sectional view illustrating a cutter element slidably and rotatably mounted on the wire and particularly pointing out the fillets resulting from low temperature soldering of the rear portion of the helical spring to the wire while the portion of the spring adjacent to the cutter is free to compress in response to urging of the cutter against it.

Single filament flexible metallic wire 20 in FIG. 1 carries helical spring restraining elements 22 thereupon, the rear portion 24 of helical spring restraining elements 22 being low temperature soldered to single filament flexible metallic wire 20 while the front portions 26 of helical spring restraining elements 22 are free to slidably compress along the axis of single filament metallic wire 20. Cutting elements 27 each comprise slidable, rotatable carrier 28 encompassing single filament metallic wire 20 and carrying abrasive cutter element 30 thereupon. Upon impact with the material to be cut (not shown), slidable rotatable carrier 28 engages helical spring restraining element 22 and the shock of impact is absorbed by compression of front portion 26 of helical spring restraining element 22 while slippage is prevented by rear portion 24 of helical spring restraining element 22 fixed to single filament flexible metallic wire 20 thus preventing bare spots on single filament flexible metallic wire 20 as well as preventing clumping together of abrasive cutting elements 27.

Referring now to FIG. 2, single filament flexible metallic wire 20 having a substantially circular cross section, is preferably made from drawn high strength corrosion resistant alloy such as corrosion resistant steel which may be suitably heat treated to enhance its fatigue resistance properties. Many nickel and cobalt based alloys are also suitable. The substantially circular cross section reduces considerably the stress concentration associated with other solid body wires. Its small outside diameter, preferably less than 0.190 in., significantly reduces the fluctuating stress caused by repeated bending of the body on a wire saw, thus enhancing fatigue life, and also allows a wire construction of small dimensions to maintain a narrow cut. Further, the wire material and cross section allow rapid butt welding of the wire ends together to produce a reliable and fatigue resistant joint. Such butt welding can readily be accomplished on site in the field.

FIGS. 2-7 illustrates in detail the clearance between interior surface 32 of slidable, rotatable carrier 28 and single filament flexible metallic wire 20 which allows slidable rotatable carrier 28 to slide upon single filament flexible metallic wire 20 as well as pass over the drive drums or sheaves (not shown) used to propel single filament flexible metallic wire 20 through the cut in the material being sawed.

Helical spring restraining elements 22, may be wound from high strength steel such that their relaxed inside diameter is less than the outside diameter of the body 20. Thus upon assembly of the helical spring restraining elements 22 onto the single filament flexible wire 20, they become loaded in torsion and therefore friction at the body-spring interface holds helical spring restraining elements 22 locked in position. In many cases, this lock will provide sufficient resistance to longitudinal motion to effectively withstand the cutting loads transmitted by the cutting elements 27. In other cases, it will be advantageous to fix helical spring restraining elements 22 to wire 20 by the soldering technique described above. Because of their inherent construction, the helical spring restraining elements 22 bend very readily and therefore offer little resistance to the bending of the body 20. Either type of helical spring restraining element 22 is also easily replaced in the field without embrittling the wire.

As best illustrated in FIG. 7, cutter elements 27 comprise abrasive cutter elements 30 preferably fixed to slidable rotatable carriers 28 by brazing indicated by braze joint 36. Slidable rotatable carriers 28 are preferably fabricated from corrosion resistant steel. Many nickel and copper based alloys are also suitable. Rear portion 24 of helical spring restraining element 22 is preferably fixed to single filament flexible metallic wire 20 by low temperature soldering indicated by fillets 38 leaving front portion 26 of helical spring restraining element 22 free to longitudinally compress along the axis of single filament flexible element 20 as indicated by the absence of fillets. Brazing methods are well known for fixing sintered diamond abrasive in a metallic matrix to various metallic carriers as are methods of soldering which are effective in joining metals without exceeding temperatures of 1000° F. at which many of the alloys which are suitable for the steel single filament flexible metallic wire would become embrittled. Single filament flexible metallic wire 20 as well as slidable, rotatable carriers 28 are preferably fabricated from corrosion resistant ferrous alloys.

The cutting elements 27, are an assembly of the steel carrier sleeves 28, high strength bonds 36, and abrasive cutting elements 30. The inside diameter of steel carrier sleeves 28 is larger than the outside diameter of the wire 20 to purposefully create a radial clearance that lets steel carrier sleeves 28 slide loosely over wire 20. Both the radial clearance and longitudinal length of steel sleeves 28 are controlled so that the section of wire 20 inside the steel sleeves 28 can bend unrestricted to small radii as shown in FIG. 6. A further consequence of this design using loosely fitted steel carrier sleeves 28, is that sleeves 28 are never forced to bend in use, and therefore high strength bond 36 is never subjected to bending loads. Thus high strength silver braze bonds, such as those presently used to bond diamond segments to circular stone cutting blades, may be used to bond cutting segments 30 to the steel sleeves 28. This produces a rugged cutting element 27 of extremely high strength.

The matrix of cutting segments 30 is produced by known powdered metal technology. Cutting abrasive is continuously distributed throughout its depth reducing downtime to replace cutting segments and also providing extremely long life. In the preferred embodiment of the invention, cutting segments 30 are circular in shape, but suitable cutting elements can be created with discrete blocks or cutting segments bonded to the steel carrier sleeves 28 to produce an essentially circular cutting element or any other shape desired.

Figure 11:
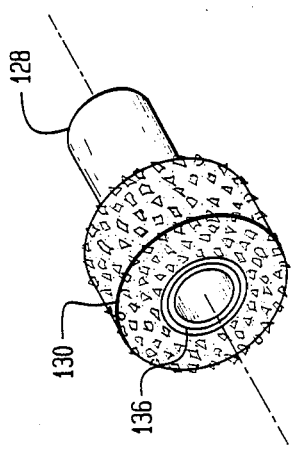
FIGS. 9-11 illustrate an alternative cutting element which is advantageously used when higher cutting pressures are desired.
Figure 10:
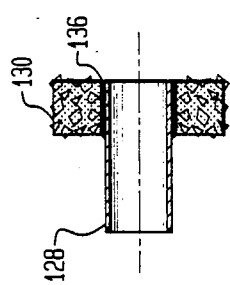
Figure 9:
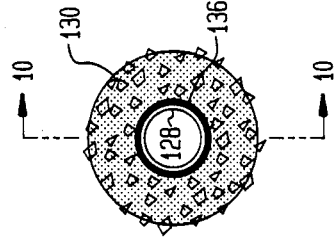
Figure 14:
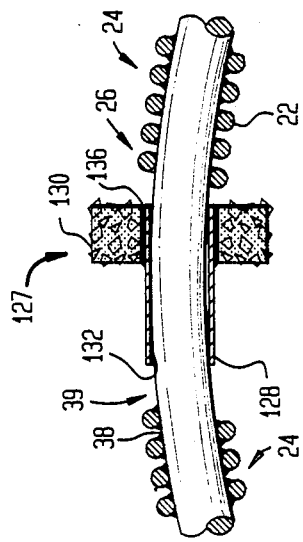
FIGS. 13 and 14 illustrate the mounting of the cutting elements of FIGS. 9-11 upon the wire.
Figure 12:
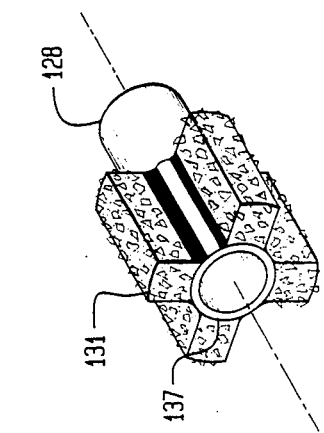
FIG. 12 illustrates still another alternative cutting element bearing substantially rectangular abrasive cutter elements.
Figure 13:
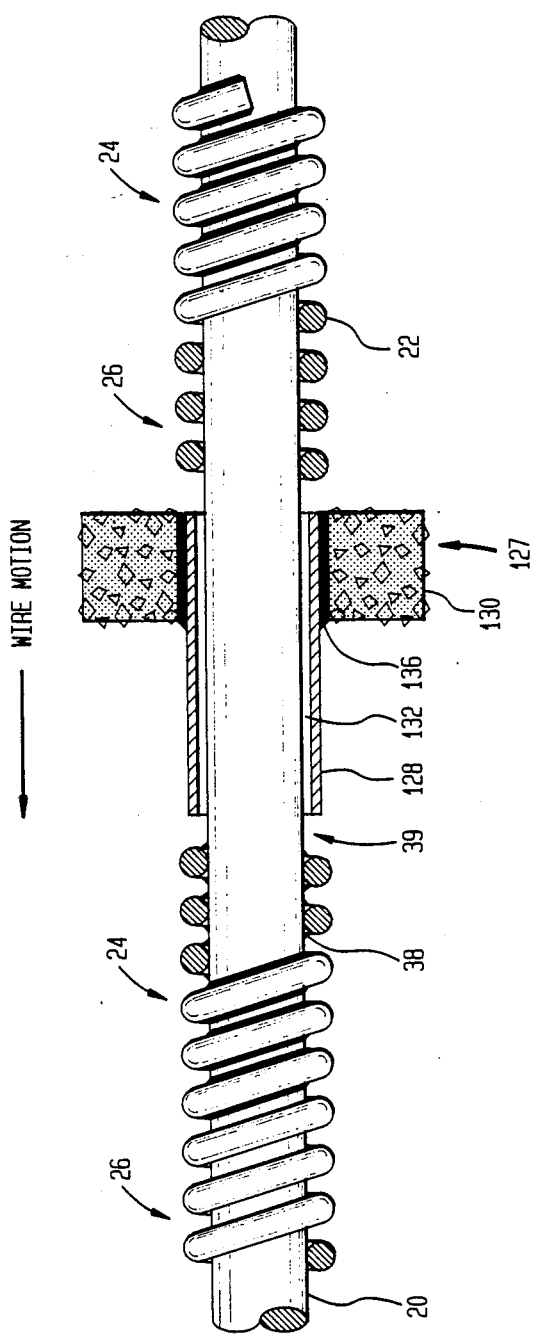

FIGS. 9-11 illustrate high cutting pressure element 127 in which abrasive cutter element 130 is relatively short as compared to slidable rotatable carrier 128 thus producing increased cutting pressure. FIG. 12 illustrates an embodiment in which substantially rectangular abrasive cutter segments 131 are brazed at braze joint 137 to carrier 128. Fewer or more segments 131 may be used to advantage. FIGS. 13 and 14 illustrate the arrangement of high cutting pressure elements 127 upon wire 20.

The abrasive elements are preferably comprised of diamond or another hard material such as cubic boron nitride, fixed in a metallic matrix by techniques which are well known.

The cutting wire is constructed by assembling alternately, helical spring restraining element 22 and cutting elements 27 onto the wire 20, at the desired space apart relation, such that clearance 39 is created so cutting elements 27 can slide freely over this limited clearance. In the preferred embodiment of the invention, only one cutting element 27 bears against each helical spring restraining element 22. Within the scope of this invention, numerous cutting elements 27, may bear against a single helical spring restraining element 22. FIG. 8 illustrates an alternative embodiment in which a multiplicity of abrasive cutter elements are restrained by a single helical spring restraining element 22 and slidable rotatable collars 34 separate adjacent slidable rotatable carriers 28 borne on single filament flexible metallic wire 20. When all cutting elements 27 are trapped between helical spring restraining elements 22, a short length of free space is left at each end of wire 20 which are joined by butt-welding thus forming a continuous cutting wire capable of operating on the usual spaced apart sheaves of a wire saw.

In cutting, the wire travels in the direction indicated in the figures. During cutting, the cutting load holds cutting elements 27 firmly so little rotation of cutting elements 27 occurs, which because of their looseness, are able to orient themselves to accommodate bends in wire 20 and the orientation of the cut surface (not shown). After exiting from the cut, cutting elements 27 are free to rotate and slide. Upon entering into the liner (not shown) of the wire saw sheaves (not shown) cutting elements 27 come in contact with the liner but are free to accommodate the bend in wire 20 and the surface of the liner. Even though cutting elements 27 are free to move while engaged with the liner, cutting wire drive forces are still transmitted from the driving wheel liner to wire 20. Because of the large size of wire saw sheaves, a considerable length of wire engages the driving sheave, and therefore the driving forces are spread out, so the driving force per cutting element is of low magnitude. Under such circumstances, driving of the cutting wire occurs by two methods. In some cases, cutting elements 27 slide into engagement with the rear end of the forward helical spring restraining element 22, and then transmit the driving force through helical spring restraining element 22 to the wire 20. For other cases, if cutting elements 27 are not in contact with either of adjacent helical spring restraining elements 22, driving forces are transmitted by the frictional forces existing between steel sleeves 28, and that portion of the wire 20 bent within steel sleeves 28.

As my invention, I claim:

1. A wire saw comprising:
a single filament flexible metallic substantially circular wire having slidably and rotatably mounted thereupon a multiplicity of cylindrical rotatable, slidable carrier elements encompassing said single filament flexible metallic wire; each said slidable, rotatable carrier element having fixed thereto an abrasive cylindrical cutter element; said single filament flexible metallic wire having a plurality of helical spring restraining element means fixed thereto for yieldably and elastically restraining the longitudinal motion of said slidable rotatable carrier elements, said helical spring restraining element means having a relaxed inside diameter less that the outside diameter of said wire, each helical spring restraining element being fixed to said single filament flexible metallic wire by friction therebetween.

2. The wire saw of claim 1 wherein said filament flexible metallic wire is a fatigue resistant ferrous metal.

3. The wire saw of claim 1 wherein each said slidable rotatable carrier element is a substantially rigid annular sleeve.

4. The wire saw of claim 3 wherein said abrasive cutter elements comprise cylindrical sintered diamond bearing elements fixed to each of said slidable rotatable carrier elements by brazing.

5. The wire saw of claim 4 wherein one of said slidable rotatable carrier elements bears against each of said helical spring restraining element means.

6. The wire saw of claim 4 wherein a multiplicity of slidable rotatable carrier elements are longitudinally restrained by each of said helical spring restraining element means.

7. The wire saw of claim 6 further comprising a multiplicity of rotatable slidable collars encompassing said single filament flexible metallic wire between and separating said slidable rotatable carrier elements.

8. A wire saw comprising:
a single filament flexible metallic wire having slidably and rotatably mounted thereupon a multiplicity of rotatable, slidable carrier elements encompassing said single filament flexible metallic wire; each said slidable, rotatable carrier element having fixed thereto an abrasive cutter element; said single filament flexible metallic wire having a plurality of helical spring restraining element means fixed thereto for yieldably and elastically restraining the longitudinal motion of said slidable rotatable carrier elements, said helical spring restraining element means being fixed at one end thereof to said single filament flexible metallic wire by a non-embrittling low temperature adhesion process.

9. The wire saw of claim 8 wherein said single filament flexible metallic wire is substantially cylindrical.

10. The wire saw of claim 9 wherein said slidable rotatable carrier element is substantially cylindrical.

11. The wire saw of claim 3 wherein said abrasive cutter elements comprise cylindrical sintered diamond bearing elements fixed to each of said slidable rotatable carrier elements by brazing.

12. The wire saw of claim 11 wherein said non-embrittling low temperature adhesion process comprises low temperature soldering of said helical spring restraining element means to said single filament flexible metallic wire at a temperature below 1000° F.

13. The wire saw of claim 12 wherein one of said slidable rotatable carrier elements bears against each of said helical spring restraining element means.

14. The wire saw of claim 12 wherein a multiplicity of slidable rotatable carrier elements are longitudinally restrained by each of said helical spring restraining element means.

15. The wire saw of claim 14 further comprising a multiplicity of rotatable slidable collars encompassing said single filament flexible metallic wire between and separating said slidable rotatable carrier elements.

16. The wire saw of claim 12 wherein each of said helical restraining element means comprises a helical spring encompassing said single filament flexible metallic wire having a portion thereof low temperature soldered to said single filament flexible metallic wire and another portion thereof slidably compressible along the axis of said single filament flexible metallic wire.

* * * * *